United States Patent [19]
Gardner et al.

[11] Patent Number: 4,959,040
[45] Date of Patent: Sep. 25, 1990

[54] METHOD AND APPARATUS FOR PRECISELY POSITIONING AND STABILIZING A CONTINUOUS BELT OR WEB OR THE LIKE

[75] Inventors: Deane Gardner, Cupertino; George Fellingham, San Jose, both of Calif.

[73] Assignee: Rastergraphics Inc., Sunnyvale, Calif.

[21] Appl. No.: 341,799

[22] Filed: Apr. 21, 1989

[51] Int. Cl.⁵ .............................................. F16H 7/18
[52] U.S. Cl. .................................. 474/103; 198/807
[58] Field of Search ............................ 474/101–103, 474/237; 198/806, 807; 226/195, 174; 250/548, 561; 242/57, 57.1

[56] References Cited
U.S. PATENT DOCUMENTS 2,536,559  1/1951  Lewis .................................. 474/103
3,543,597  12/1970  Schamphelaere et al. ......... 474/103

Primary Examiner—Thuy M. Bui
Attorney, Agent, or Firm—Lyon & Lyon

[57] ABSTRACT

A device for providing extremely accurate tracking and control of a continuous belt or web driven by at least one roller such as a paper transport belt for an electrostatic plotter, printer or the like includes a method for cancelling out the effect of belt edge irregularities by sampling the irregularities in the edge of a belt at precise positional intervals for an initial rotation of the belt and storing the sampled values as elements in a reference array. The reference array is corrected to include an error component representative of linearly increasing measurement of error for each of said array elements due to lateral shifting of the belt. During subsequent operation, the lateral displacement of the belt is continuously scanned for each of said positional intervals with respect to a corresponding element of the array. A corrective feedback mechanism generates corrective feedback signals representative of a desired belt position for each of said positional intervals to thereby maintain the belt on an ideal axis of travel. In a paper transport system incorporating this device, a transport belt can be corrected within a fraction of a belt revolution, irrespective of direction, and paper or another recording medium can be accurately registered on repeated writing passes to within 0.0005 inches.

12 Claims, 5 Drawing Sheets

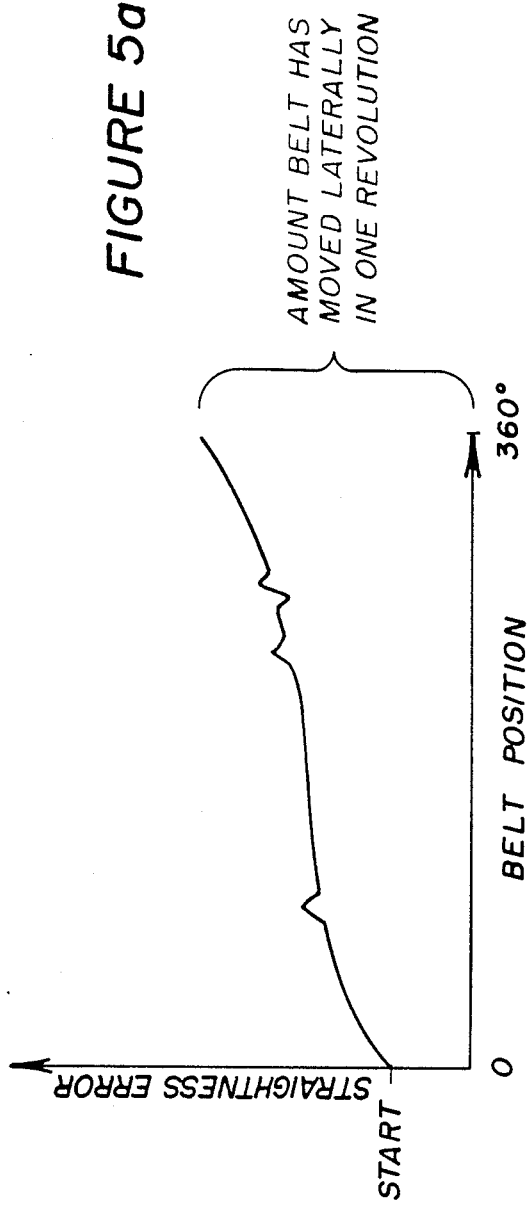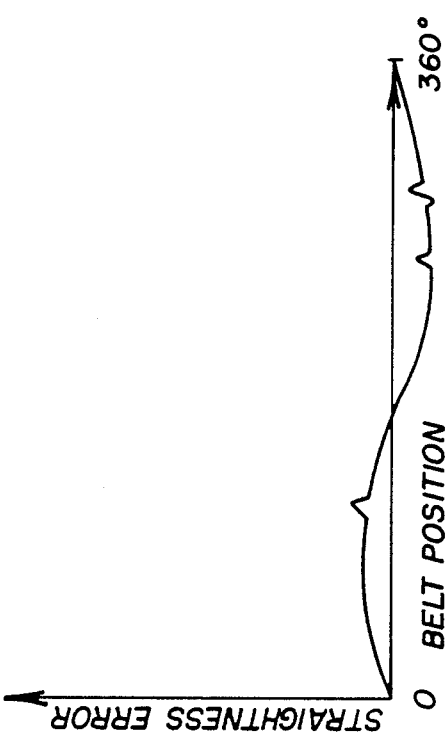
FIGURE 5a
FIGURE 5b

METHOD AND APPARATUS FOR PRECISELY POSITIONING AND STABILIZING A CONTINUOUS BELT OR WEB OR THE LIKE

This invention relates generally to a method and apparatus for accurately stabilizing and controlling the lateral position of a moving web, continuous transport belt, assembly line or the like. In particular, the present invention provides a method and apparatus for canceling lateral motion measurement errors caused by an imperfectly straight belt edge. Accordingly, the present invention provides extremely precise lateral control and accurate stabilization of a continuous transport belt or web in the presence of comparatively large belt edge irregularities or defects. The preferred embodiment has a particular application to precisely stabilizing the lateral position of a paper transport belt on rollers in a multipass raster line plotter or printer or the like. However, the present invention has broader application generally for precisely determining and stabilizing the lateral position of any moving continuous belt in multirotational systems where registration accuracy on multiple passes is essential.

In typical prior art devices incorporating a moving web or continuous belt which revolves around supporting rollers, a means must be provided to stabilize the position of the belt or web on the supporting rollers. Otherwise, the belt will slowly screw itself one way or the other off of the end of the rollers as the rollers rotate due to manufacturing imperfections in the belt or slight errors in the alignment of the roller assembly.

The typical prior art devices for determining and adjusting the position of a moving belt can not achieve the degree of precision provided by the present invention. Prior art methods fail to take into account the as-manufactured or introduced irregularities of the edge of a belt or web. Also, it is ordinarily not possible in the prior art to take into account imperfections introduced into the belt edge through continued use. Such imperfections may be due to stretching of the belt or degradation of the integrity of the belt due to normal wear and tear or prolonged usage. Moreover, prior art devices for determining and adjusting the position of a continuous transport belt supported on rollers may be unduly complex and expensive to implement.

For example, Rajagopal, U.S. Pat. No. 4,557,372 discloses an alignment apparatus for a transparent belt which includes an encoder for detecting the movement of the belt about the rollers and for generating a signal proportional in frequency to the speed of the belt. A fixed photo detector senses the position of a plurality of flags mounted on the belt and thereby determines the lateral position of the belt. A microprocessor, in response to signals from the photo detector, generates a stepper motor drive control signal which actuates a stepper motor to move the belt laterally to a desired position. The microprocessor controls a counter which counts the number of pulses that are generated by the encoder during the period of time a portion of a flag passes by the detection window of the photo detector. The flag breaks the light beam otherwise passing to the photo detector through the transparent belt. The microcomputer then generates a signal representative of the number of pulses counted. This signal is passed to the stepper motor control circuit. In addition, the microprocessor includes a timer which is programmed to introduce a timed delay between successive counting operations. This delay is introduced in order to enable the belt adjusting assembly to have sufficient time to effect a lateral shifting of the belt before the next adjustment is made and thereby avoid any oscillatory hunting motions which might otherwise occur.

Pfizenmaier, et al., U.S. Pat. No. 4,641,070 discloses a device for determining and adjusting the position of a web or belt. Two sensor units each with a light source element are directed towards the web. A control unit responsive to respective output signals of the two sensor units sends an adjusting signal to a device for adjusting the position of the belt. The adjusting signal fed from the control unit to the adjusting device is a function of the difference of the two output signals of the two sensor units. In order to compensate for a belt that does not have a constant width, the output signal of at least one of the two sensor units is coupled to the control units by means of a low pass filter which eliminates rapid variations of the output signal from the sensor unit which are attributable to variations in the width of the belt.

A disadvantage of prior art devices such as those disclosed above is that relatively elaborate, complex systems are required to detect the lateral movement of a belt, which greatly increases the overall cost of the system in which such belt tracking mechanisms are employed. An additional disadvantage of the Rajagopal patent is that it requires the use of a transparent belt which necessarily limits the scope of its application.

Moreover, such devices are incapable of the extreme precision required in a multicolor, multipass electrostatic or thermal plotter or printer wherein the written areas for successive color passes must be tracked precisely to a previous pass. For example, a standard prior art electrostatic plotter must reliably track a writing head to a previous pass of written dots under varying environmental conditions at an accuracy of at least 0.0050 inches which is the distance between ordinary writing nibs. A preferred accuracy is 0.0025 inches, or one half of the distance between the writing nibs. Without such accuracy, precise color to color registration on multiple writing passes in a multipass raster line printer or plotter is not possible.

Thus, a further disadvantage of prior art belt tracking systems is that such devices can not compensate for small scale deviations in lateral belt edge straightness due to manufacturing imperfections in the belt edge or irregularities introduced by wear and tear. These seemingly minor imperfections can introduce enough error into prior art belt tracking mechanisms such that the required accuracy of tracking a belt precisely to within 0.005 to 0.0025 inches is impossible to obtain. Accordingly, prior art devices are not suitable for use in high resolution, multipass raster line printers and other multirotational systems where a repeatedly high degree of precision in positioning and stabilizing a belt is required.

A major problem in the prior art which prevents the accurate control of the lateral position of a transport belt or web to the present degree of repeatability is the detection and compensation for minor irregularities or manufacturing errors in the straightness of the belt edge. Also, subsequent use and handling of a transport belt during normal operation and servicing of the system may continually introduce new edge straightness errors over the life of the system. In the prior art, the lateral position feedback control signal from the belt edge position sensor ordinarily contains two components. A small signal corresponds to minute lateral motions of the belt, and a potentially much larger interference signal corresponds to manufactured or introduced errors in the straightness of the belt edge. The interference signal complicates the process of accurately sensing the actual lateral position of the belt and prevents proper control of the tracking feedback mechanism. The larger interference signal tends to disrupt the tracking feedback mechanism causing it to respond wildly to belt edge straightness errors. In the event the system is being used in a multipass raster line plotter or printer, the interference signal corresponding to errors in the straightness of the belt edge severely compromises the feedback mechanisms accuracy and can produce visible registration errors in the finished plot.

Accordingly, there is a need for a high precision belt or web alignment system which is relatively simple in construction and economical to implement. In addition, there is a need for a belt alignment mechanism that can cancel out the effects of minor belt edge manufacturing irregularities which may introduce an error component in tracking and positioning a belt. There is a need for a belt alignment apparatus that can take into account irregularities in belt edge dimensions which are continually being introduced due to normal wear and tear or prolonged usage. There is also a need for a belt tracking system which can provide extremely precise stabilization of a belt in a multirotational system with a high degree of repeatability to enable such a system to be suitable for use in a multipass, high resolution raster line printer or plotter or the like.

SUMMARY OF THE INVENTION

In order to overcome the foregoing disadvantages of known belt tracking systems, the present invention provides a method and apparatus for canceling the static or as-manufactured and later introduced belt edge straightness errors by establishing a reference array of belt edge straightness deviations for corresponding precise positional intervals on the belt. Thus, a reference array is established wherein each element of the array corresponds to the as-manufactured or introduced belt edge irregularity for precise positional intervals along the belt. During normal operation of the system, an appropriate element of the straightness deviation array is subtracted from every corresponding lateral position sample taken by a lateral position sensor. The present invention incorporates a feedback system to continuously sense the lateral position of the belt edge and subtract the appropriate element of the straightness error array from each sensed lateral position to thereby control and stabilize a belt or web with a previously unattainable degree of precision.

The key to generating the corrective feedback signal with the present extreme degree of precision is provided by effectively calibrating the belt, every time the belt is to be run, to determine straightness irregularities (including newly introduced irregularities) for precise positional intervals along the entire length of the belt. The process of calibrating the belt includes presampling the lateral dimensional irregularities of the edge of the belt at precise positional intervals for a complete revolution of the belt and storing the sampled values of belt edge irregularities as elements in an array.

The initial calibration run or process of presampling the dimensional irregularities of the edge of the belt is as follows. A microprocessor controller initially sends a signal to the belt tracking actuator to center the actuator and thus roughly zero the belt's potential lateral velocity. The microprocessor then runs the belt either forward or reverse and samples the output of the lateral position sensor at precise positional intervals determined by a linear position encoder for one complete belt revolution. This results in a raw array of numbers which represent the current straightness irregularity of the belt edge along with a linearly increasing error component corresponding to the imperfectly zeroed lateral motion of the belt. Because the positional samples are taken for one complete belt revolution, the first sample is taken at the same physical position on the belt as the last. The difference between the initial positional sample and the final positional sample is the amount that the belt has shifted laterally in one revolution. The raw array elements are then adjusted as will be explained infra to subtract out the linearly increasing error component caused by the lateral skewing of the belt due to the unavoidable imperfections in the belt and the centering of the belt tracking system. This error is subtracted out in a proportionally increasing manner from each array element. The array of numbers resulting in effect provide a reference array of belt edge positions relative to a position fixed with respect to an ideal axis of travel at precise intervals along the length of the belt.

During normal belt operation, a microprocessor control means senses the displacement of the belt from its ideal axis of travel at each of the corresponding positional intervals and produces a corrective feedback signal representative of the difference between the sensed position and the corresponding array value for that position. It will be appreciated that the method according to the present invention provides the cancellation of static (as-manufactured and later introduced) belt edge straightness errors by subtracting out an appropriate element of the corrected straightness array for every lateral position sample of the belt taken by the lateral position sensor means. This is used to generate by well known techniques a control feedback signal for moving the tracking actuator drive to adjust the angle one of the rollers such that the belt is maintained in a substantially invariant and constant position with respect to an ideal axis of travel during operation. The present invention is thereby able to control belt lateral motion to a previously unattainable high degree of accuracy and repeatability. The application of the foregoing method and apparatus in a multipass, multicolor raster line printer or plotter reduces the amount of lateral shift of the belt over repeated writing passes to within 0.0005 inches. This advantage has potentially significant economic consequences when applied to a multicolor, raster line plotter, printer or copier system wherein a repeatably high degree of precision is necessary to achieve proper color to color registration on multiple passes of a web or paper transport belt. The present invention greatly reduces the complexity and cost of a belt tracking system and enables the use of a less expensive belt. The preferred embodiment also enables a continuous transport belt in a plotter, printer or the like to be positioned and stabilized with a previously unattainable degree of precision.

BRIEF DESCRIPTION OF THE DRAWINGS

These and other advantageous of the present invention may be appreciated from the following detailed description of the preferred embodiment together with the drawings in which:

FIG. 5 is a graphical representation of uncorrected belt edge straightness array elements with the linearly increasing error component corresponding to the lateral shifting of the belt.

FIG. 5a is a graphical representation of corrected belt edge straightness array elements.

DETAILED DESCRIPTION

Figure 1:
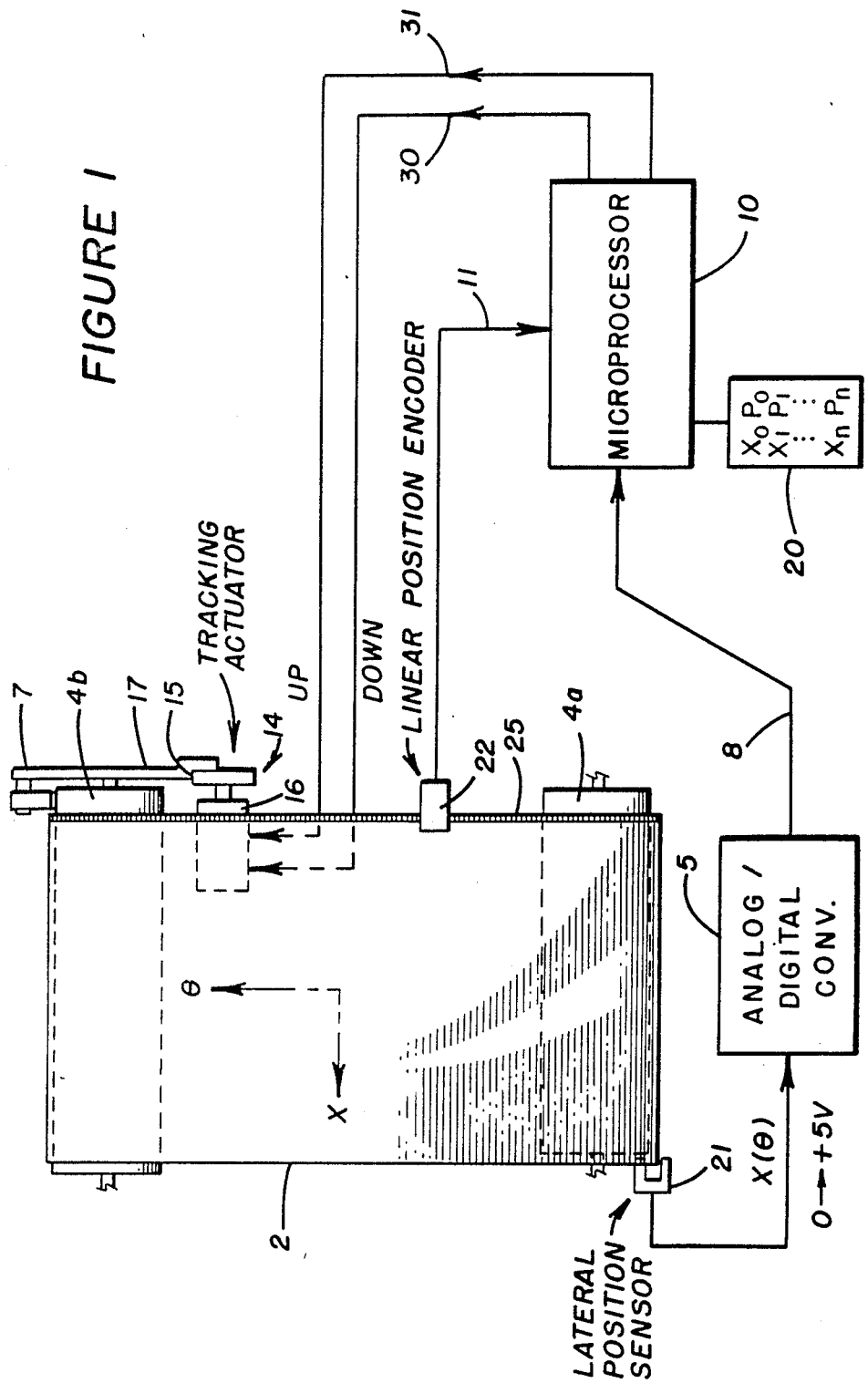
FIG. 1 is a schematic view of a first embodiment according to the present invention.

Referring to FIG. 1, an apparatus according to the present embodiment provides an improved tracking and control mechanism for precisely stabilizing and positioning a web or continuous transport belt 2 on a pair of supporting rollers 4a and 4b.

As explained previously, a problem inherent in the use of a continuous belt, traveling web, or the like which are supported on rollers is that the belt 2 or web tends to move laterally (in the X direction as shown in FIG. 1) relative to rollers 4a and 4b which support the belt. Without constant realignment, the lateral movement of the belt 2 after prolonged use would cause the belt 2 to literally screw itself off of the rollers 4a and 4b. Accordingly, it would be impossible to use such a belt system for any multirotational system requiring precise operation.

Figure 2:
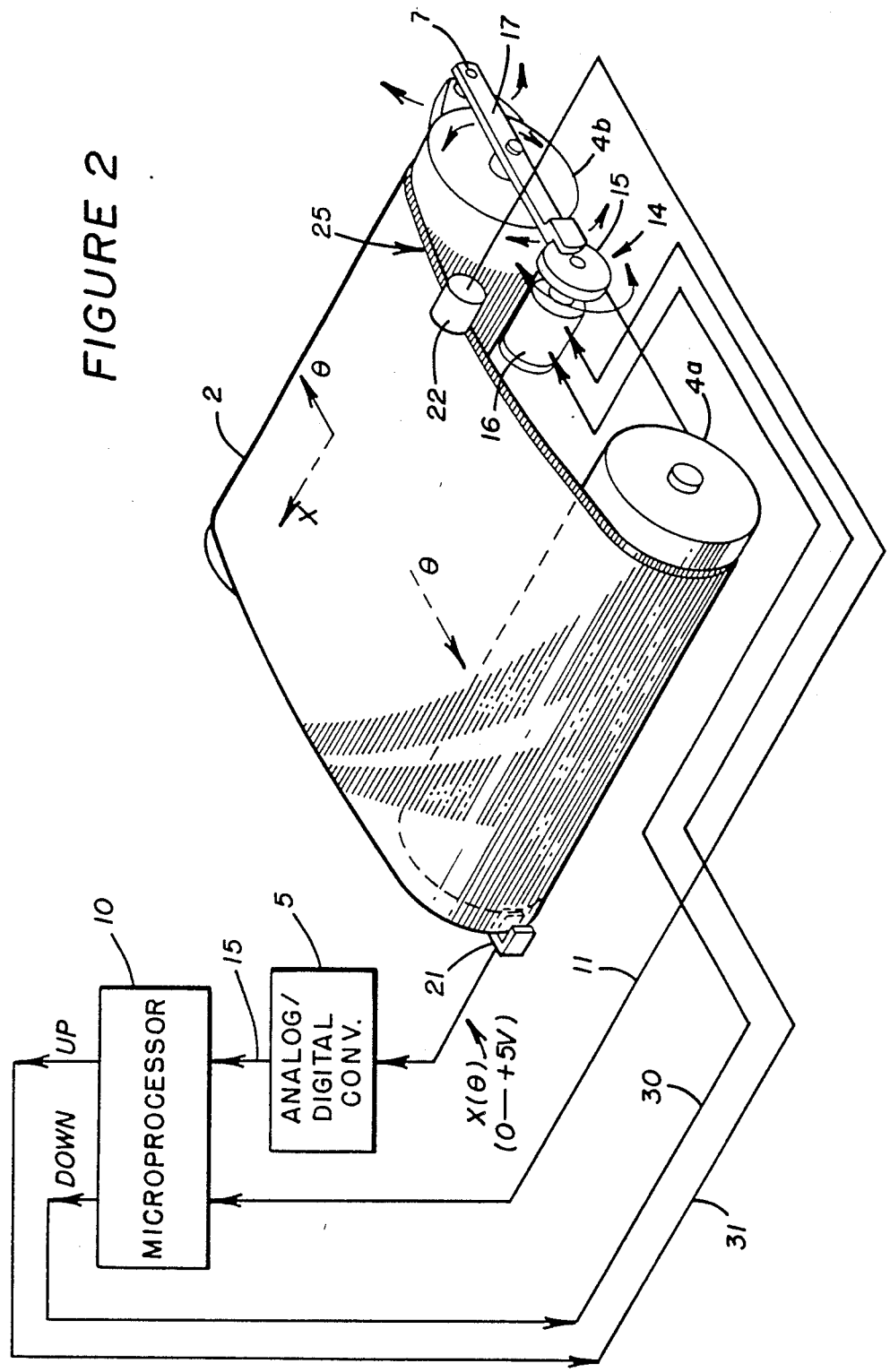
FIG. 2 is a perspective view of the belt stabilizing mechanism according to the present invention.

In the present invention, rollers 4a and 4b support and move the belt 2 at least one full revolution in a forward or reverse direction as indicated by $\Theta$ as shown in FIGS. 1 and 2. In the preferred embodiment, roller 4b is a pivoting or tracking roller which forms, in combination with tracking actuator means 14, a means for stabilizing the belt 2 by counteracting the inherent lateral shift in the belt 2. This is accomplished by moving the angle of roller 4b up or down relative to the plane of belt 2 in order to counteract and thereby eliminate the lateral movement of the belt 2 and stabilize it in a substantially constant position on the rollers 4a and 4b.

The tracking actuator means 14 consists of a small motor 16, an eccentric 15 and lever 17. The eccentric 16 and lever 17 are connected with the central axis of the pivoting roller 4b and with a fixed pivot point 7. Corrective feedback signals indicating that the pivoting roller 4b is to be moved up or down are applied to the tracking actuator drive means 16 along lines 30 and 31. In response to the corrective feedback signals along lines 30 and 31, the eccentric 16 and lever 17 are activated to move one end of the pivoting roller 14b up or down about its central axis relative to the plane of the belt. The opposite end of pivoting roller 4b pivots but is otherwise fixed.

Figure 3:
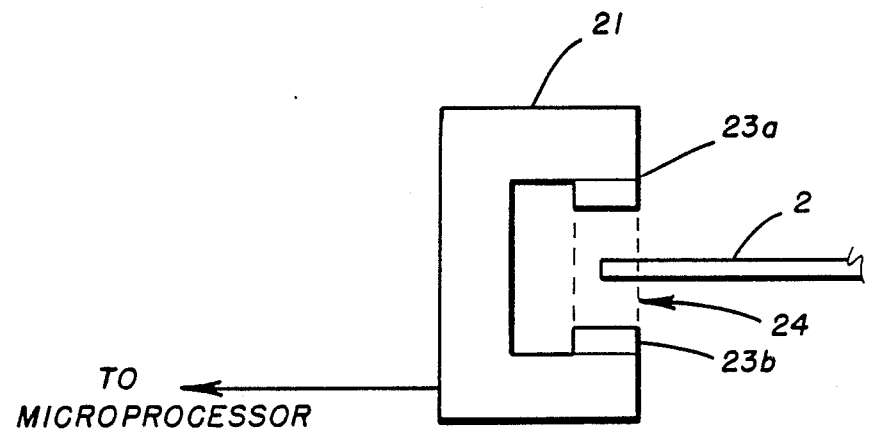
FIG. 3 is a side view of lateral position sensor means according to the present invention.

In the preferred embodiment, a means for generating the corrective feedback signal to drive the tracking actuator means 14 is provided as follows. An inexpensive belt edge position sensor or lateral position sensor means 21 is provided for sensing the lateral position of the edge of the belt 2 at precise positional locations. In the preferred embodiment, the belt 2 slightly overhangs roller 4a. The lateral position sensor means is positioned such that the active scanning region partially envelops the edge of the belt 2, to thereby sense fine deviations in the lateral position of the edge of the belt 2. In the preferred embodiment, the lateral position sensor may be an inexpensive optical sensor 21 having an emitter, 23a and a detector, 23b defining an active scanning region or window 24 as shown in FIG. 3. However, any suitable proximity sensor for producing an output signal as a function of fine irregularities or deviations in the lateral proximity or movement of the belt 2 would be possible. In the preferred embodiment, the lateral position sensor means 21 produces an analog voltage varying between 0 and approximately 5 volts depending upon the portion of the active window 24 which is blocked by the belt edge 2. The sensor 21 has an active scanning region 24 as shown in FIG. 3 which is large enough to include foreseeable errors in the belt edge lateral location on the roller 4a. Also, the lateral position sensor 21 is sensitive enough to detect very fine manufacturing defects or irregularities in the straightness of the belt edge.

The purpose of the lateral position sensor 21 is twofold. The lateral position sensor 21 produces an output signal to the microprocessor 10 for keeping the belt accurately positioned on the rollers to within one or two-hundredths of an inch over the lifetime of the system. Also, the lateral position sensor 21 provides an extremely reliable degree of repeatability for stabilizing the lateral position of the belt 2. That is, for multiple passes of the belt 2, the lateral position of the belt can be maintained substantially constant. This means that when applied to a multipass raster line printer or plotter or the like, a belt system incorporating the present invention during repeated writing passes would be capable of tracking the belt to a previous pass to within 0.0005 inches, thereby achieving precise color to color registration and greatly enhancing resolution.

The positional intervals are established by encoding strip 25. In the preferred embodiment these intervals are one one-hundredth of an inch apart, but could be any convenient interval. The intervals on encoding strip 25 correspond to precise positional locations and are detected by linear position encoder 22 as the belt 2 rotates.

The elements in the array 20 are representative of the belt edge straightness errors for precise positional intervals along the belt are established as follows. Initially, the microprocessor controller 10 centers the belt tracking mechanism by sending appropriate signals along lines 30 and 31 to the belt tracking actuator 14. This also sets the belt potential lateral velocity X to approximately 0. The microprocessor controller 10 then runs the belt in a forward or reverse direction ($\Theta$) for one complete revolution of the belt and samples the output of the lateral position sensor at precise positional intervals which are determined by encoding strip and linear position encoder 22. For each positional interval the linear position encoder 22 provides an output signal on line 11 to microprocessor 10. This also provides the address of each of the error elements in the array 20. For each positional interval P sampled, the lateral position sensor 21 produces an output analog voltage from which is proportional to both the belt lateral position X and the belt edge irregularity at a precise positional interval determined by encoding strip 25. The output signal X ($\Theta$) produced by lateral position sensor 21 shows that the belt edge position is a function of the rotational position of the belt. The analog voltage signal X($\Theta$) is, in the preferred embodiment, an output signal ranging from 0 to +5 volts. The voltage output is dependent upon how far the belt 2 intrudes into the active scanning window 24 of the lateral position sensor 21 as shown in FIG. 3. This output voltage is converted to a convenient digital output for simplified interfacing with microprocessor 10 according to well known techniques by the analog digital converter 5. The digital output signal is then applied by line 8 to the microprocessor 10. The microprocessor controller 10 matches each value produced by the signal representative of the belt edge lateral error with the precise positional interval from linear position encoder 22 at which such sample was taken. These values are then stored according to well known techniques in an array of numbers 20. The array 20 which represents the current straightness irregularity of the belt edge, along with a linearly increasing error corresponding to the imperfectly zeroed lateral motion component of the belt.

Because the samples are taken for one complete revolution of the belt, the last sample taken is at approximately the same physical position on the belt as the first sample as determined by linear position encoder 22 and encoding strip 25. Except for the nonzero lateral motion component of the belt 2, the first and final sample in the array should result in the same reading. The difference between the two samples is the amount that the belt has shifted laterally in one revolution. This is represented graphically in FIG. 5a.

The elements in array 20 are then adjusted to correct for the linearly increasing lateral creep of the belt 2 caused by the imperfect centering of the belt tracking system as shown in FIG. 5a. The microprocessor controller 10 subtracts this error in a proportionally increasing manner form each array element along with the basic lateral position of the belt at the start of sampling in accordance with the following equation:

$$X_i = X_i - (XO*(n-i)/n + Xn*(i/n))$$

In the equation above, the error samples of the array 20 $X_i$ (i=o to n) are each adjusted. XO is the first sample taken during the lateral belt edge error measurement and Xn is the last measurement taken (at one belt revolution past XO). The result of this correction is shown graphically in FIG. 5b.

It will be appreciated that the elements in the reference array 20 represent, in effect, a locus of belt positions which define an ideal axis of travel for the belt 2.

During normal operation, the belt tracking actuator means 14 is continually supplied with corrective feedback signals for moving pivoting roller 4b up or down to thereby maintain belt 2 in a substantially constant and invariant lateral position with respect to the rollers 4a and 4b. The microprocessor controller 10 applies the corrective feedback signals along lines 30 and 31 as follows. During normal operations that is, after the first revolution and presampling of belt edge straightness irregularities, the lateral position sensor means 21 continues to monitor the lateral belt edge position of belt 2 for precise positional intervals determined by linear position encoder 22 and encoding strip 25. While belt 2 is rotating about rollers 4a and 4b, an appropriate element of the straightness error array 20 which was previously established during the initial presampling revolution of the belt 2 is subtracted from each corresponding belt edge position obtained from the lateral position sensor means 21. This is done according to conventional techniques by the microprocessor controller 10.

It will be appreciated that the subtraction of an appropriate error element of array 20 from each corresponding belt edge position sample taken during normal operations cancels out the lateral motion measurement errors caused by the imperfectly straight belt edge. Conventional feedback control methods, including proportional plus derivative control are then applied to the position error data by microprocessor controller 10. Microprocessor controller 10 then provides the corrective feedback signals along lines 30 and 31 to the tracking actuator means 14. The signals along lines 30 and 31 are representative of the degree to which the tracking actuator means is to move the angle of pivoting roller 4b either downward or upward with respect to the plane of the belt 2 to counteract the lateral skewing of the belt 2.

In summary, during normal operation the microprocessor subtracts an appropriate element of the straightness error array 20 from each corresponding belt edge position sample taken by lateral position sensor 21. This cancels all lateral motion measurement errors caused by the imperfectly straight belt edge and thus the microprocessor is able to determine the actual position of the belt 2 on the rollers 4a and 4b at any given positional interval during the rotation of the belt. With the actual lateral position of the belt 2 known, the microprocessor controller 10 is then able to precisely control the lateral motion of the transport belt 2 with a previously unattainable high degree of precision and repeatability.

Figure 4:
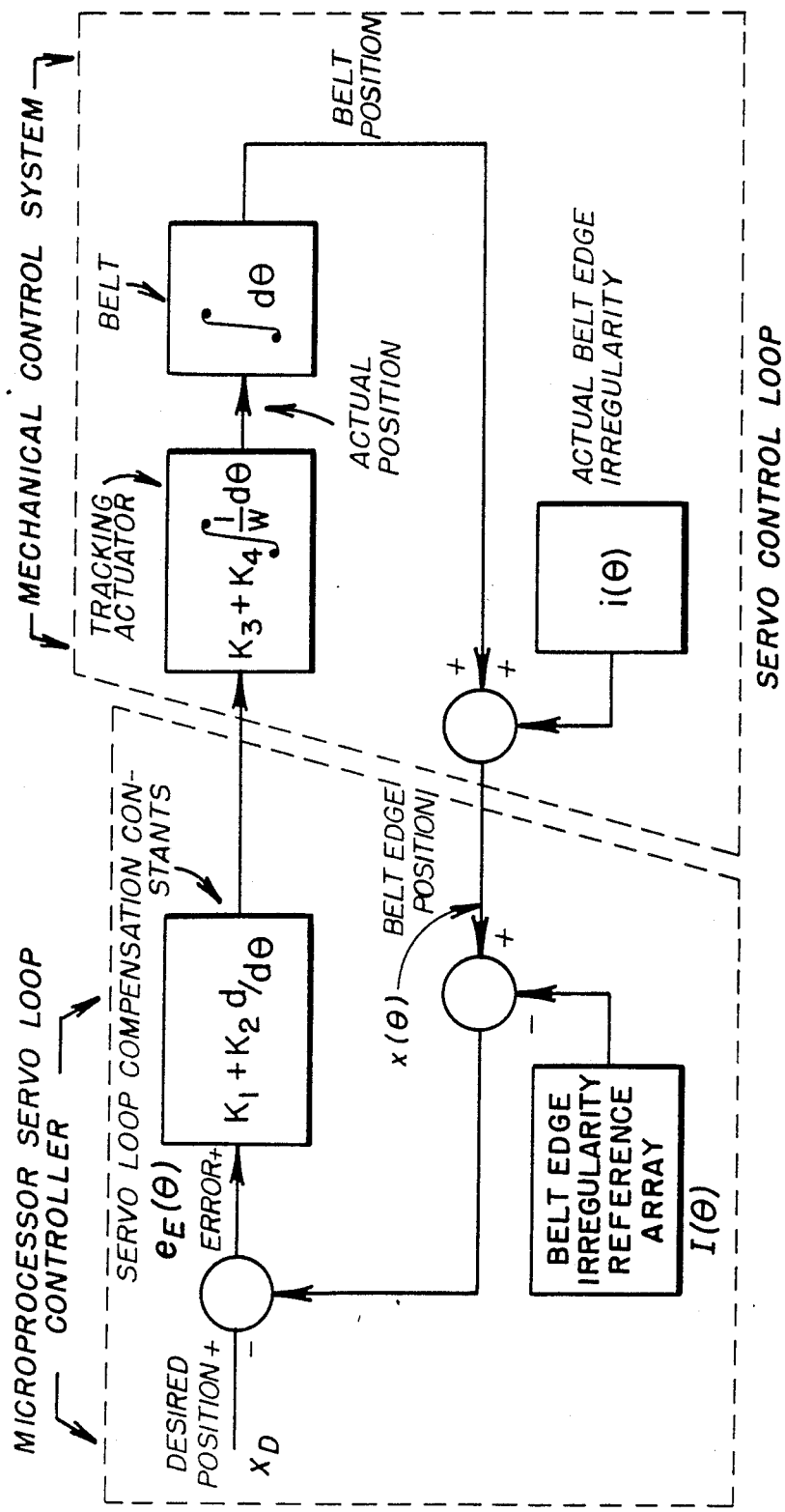
FIG. 4 is a schematic diagram of the servo control loop according to the present invention.

The precise control achieved by the microprocessor controller 10 is accomplished through conventional feedback control methods which are well known and can be implemented by one skilled in the art without undue experimentation. An exemplary block diagram of the mathematical representation of the servo control loop, including the response of the tracking actuator 14 and belt 2 to the control commands from the microprocessor 10 is shown in FIG. 4 is illustrative only and any suitable feedback method for producing an output signal representative of the direction and amount the belt 2 is to be moved in order to compensate for lateral creep would be suitable for implementing the present invention. Using the servo control loop in accordance with the present invention, the microprocessor controller 10 is able to control the lateral position of the belt on repeated passes of the belt to within 0.0005 inches.

The measurement error cancellation technique according to the present invention is achieved by the presampling of the belt edge irregularities and the establishment of the straightness error array representative of each of the measured irregularities at precise positional intervals along the belt. A presampling of belt edge irregularities during the initial complete revolution of the belt establishes a new error array each time the web or continuous belt system is to be operated. This enables the values of the array 20 to be periodically updated to correct for minor irregularities in belt edge straightness due to normal wear and tear and extreme changes in temperature. Accordingly, the measurement error cancellation technique of the present invention renders the present belt tracking system immune to even relatively large belt edge irregularities. The method and apparatus according to the present invention thereby enables a belt or web can to be accurately and repeatably registered to a desired position without the need for a perfectly straight belt edge. This has the advantage of substantially reducing the manufacturing costs of a continuous belt or web. Moreover, a belt or web can be used for a longer length of time without introducing registration errors into the system.

The application of the present method and apparatus for error cancellation in a continuous belt or web system has potentially enormous advantages in the field of multipass raster line printers and plotters. With the improvement in belt lateral position accuracy over repeated writing passes as provided by the error cancellation technique according to the present invention, the lateral position of a belt or web now can be controlled accurately enough for excellent multipass color to color registration over an extended period of time. It has been found that in a multicolor, multipass electrostatic plotting system, the belt itself can be accurately shifted laterally one half dot between extended resolution writing passes while moving the plotting medium laterally exactly the same amount, thereby effectively increasing the writing resolution by a factor of two. See copending U.S. patent application Ser. No. 07/341,694. In accordance with the present invention, a paper transport belt and the recording medium stabilized thereon now can be accurately registered on repeated passes to within 0.0005 inches. This has the advantage of providing a multipass raster line printer or plotter capable of extremely high resolution at a substantially reduced cost. Several alternate embodiments of the present invention are possible without departing from the spirit and scope of the appended claims. For example, various other mechanical arrangements could be used to replace the motor 16, eccentric 15 and lever 17 used to tilt the end of pivoting roller 4b. For example, linear actuators such as solenoids, air cylinders, voice coils or the like could replace the entire tracking actuator means 14 and act directly on one end of one roller. Alternatively, a rotary solenoid could replace the motor 16 in the tracking actuator means 14 as disclosed.

Various other sensor technologies could replace the preferred optical sensor used in the lateral position sensor means 21 to detect the belt edge position. Alternative sensor means could include capacitive, magnetic or other proximity sensors. Also, various types of through-beam sensor technologies using air or ultra sound could be effectively substituted for the lateral position sensor means 21. With regard to a continuous belt or web system used in a multipass, raster line printer or plotter, some of the alternate sensor technologies may in fact be more suitable because they would be resistant to more fouling and subsequent inaccuracies introduced by paper dust then the optical type sensor of the preferred embodiment.

It will be appreciated that various other statistical techniques could be used to eliminate the linearly increasing lateral motion error component present in the unadjusted belt edge straightness error array. For example, a weighted average of the first few samples could be substituted for X(O) in the adjustment formula to reduce the effects of measurement noise. Also, a similar average of several samples could be substituted for Xn. Furthermore, any of a number of linear regression techniques could be used on any set of sample points generated by the lateral position sensor means. Such alternate techniques need only include some sample points near the beginning of the sample array (near the beginning of the presampling or unadjusted revolution of belt 2) and some near the end of the sample array, which would achieve substantially the same effect.

While the invention has been described in connection with what is presently considered to be the most practical and preferred embodiments, it is to be understood that the invention is not limited to the disclosed embodiment and alternatives as set forth above, but on the contrary, is intended to cover various modifications and equivalent arrangements included within the spirit and scope of the appended claims.

What is claimed is:

1. An apparatus for improved tracking and control of a traveling belt or web or the like supported and driven by at least one roller means comprising:
   means for establishing a reference array of belt positions relative to a position fixed with respect to an ideal axis of travel for said belt at precise positional intervals along the entire length of said belt;
   control means for sensing at each positional interval the displacement of said belt from said ideal axis of travel and for providing a corrective feedback signal representative of the displacement difference between said sensed position and a corresponding element of said reference array;
   tracking actuator means responsive to said corrective feedback signal for moving the angle of said roller to thereby maintain said belt in a substantially invariant position with respect to its ideal axis of travel.

2. An apparatus as in claim 1 wherein said means for establishing a reference array of belt positions further includes;
   encoding strip means disposed along said belt for delineating precise positional intervals thereon;
   lateral position sensor means having an active scanning region for detecting the displacement of said belt with respect to said ideal axis of travel for said precise positional intervals for a first complete revolution of said belt and for producing an output signal representative of said displacement;
   linear position encoder means responsive to said encoding strip for producing a signal representative of said precise positional interval being scanned by said lateral position sensor means;
   microprocessor control means responsive to said signals from said linear position encoder and from said lateral position sensor and for producing therefrom an array of elements representative of the position of said belt with respect to an ideal axis of travel for each of said precise positional intervals.

3. An apparatus according to claim 2 wherein said microprocessor control means further includes a means for correcting the elements of said reference array to compensate for a linearly increasing error component due to the lateral movement of said belt from its ideal axis of travel to thereby provide an array of elements representative of the desired position of said belt with respect to an ideal axis of travel.

4. An apparatus for improved tracking and control of a traveling belt or web or the like supported on a roller means comprising:
   a continuous belt;
   at least one roller means disposed for supporting and rotating said belt at least one complete revolution along an axis of travel;
   means for calibrating said belt with respect to a locus of positions defining an ideal axis of travel at predetermined precise positional intervals for a complete revolution of said belt and for storing said calibration values as elements in a reference array;
   control means for sensing the displacement of said belt at said predetermined positional intervals with respect to a corresponding reference array element and for thereby producing a corrective feedback signal representative of the desired position of said belt at each of said corresponding positional intervals;

adjusting means responsive to said corrective feedback signal for adjusting the angle of said roller means relative to said belt such that said belt is thereby maintained in a substantially invariant position with respect to said axis of travel.

5. An apparatus according to claim 4 wherein said means for calibrating includes means for correcting the particular value of said reference elements for deviations of that value from the ideal value as a result of calibration.

6. An apparatus according to claim 4 wherein said means for calibrating and said control means include a proximity sensor having an active scanning region disposed with respect to an edge of said belt such that said proximity sensor produces an output signal proportional to the position of said belt with respect to said active scanning region.

7. An apparatus according to claim 6 further including an encoding strip having representations of said precise positional intervals disposed along the length of an edge of said belt and including linear position encoder means for sensing said positional intervals of said encoding strip and for providing an output signal representative of said sensed positional intervals.

8. An apparatus according to claim 4 wherein said adjusting means includes a tracking actuator including a drive means responsive to said feedback signals in combination with an eccentric and pivoting lever having a connection with a central axis of said first roller for moving said angle of said first roller such that said belt position is maintained substantially constant with respect to said ideal axis of travel.

9. A method for precise tracking and control of a continuous belt or web or the like supported on at least one roller for rotating said belt or web comprising the steps of:

establishing a reference array of belt edge positions relative to a position fixed with respect to an ideal axis of travel for precise positional intervals along the length of said belt;

correcting said array positions to compensate for increasing lateral displacement of said belt;

sensing the displacement of said belt with respect to said reference array positions for said precise positional intervals and providing a corrective feedback signal representative of said displacement;

moving the angle of said roller in response to said feedback signal to correct for said displacement and thereby maintain set belt in a constant position with respect to its ideal axis of travel.

10. A method as in claim 9 wherein said step of establishing a reference array further includes the step of providing a representation of precise positional intervals along the length of said continuous belt and;

sampling the position of said belt at each of said precise positional intervals for a complete revolution of said belt wherein the address of each element of said array represents said precise positional interval corresponding to said sensed position.

11. A method as in claim 9 wherein said step of correcting said array values includes the step of subtracting an error component representative of linearly increasing measurement error from each of said array elements due to lateral shifting of said belt.

12. A method as in claim 9 wherein said step of sensing further includes subtracting an appropriate element of said reference array from each belt position sample sensed for each of said corresponding positional intervals to thereby generate corrective feedback signals representative of said desired belt positions for each of said intervals with respect to an ideal axis of travel.

* * * * *